(12) United States Patent
Almiman (10) Patent No.: US 10,500,645 B1
(45) Date of Patent: Dec. 10, 2019

(54) METHOD OF SYNTHESIZING SILVER NANOPARTICLES USING MINT EXTRACT

(71) Applicant: KING SAUD UNIVERSITY, Riyadh (SA)

(72) Inventor: Fozeyah Saleh Almiman, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/240,972

(22) Filed: Jan. 7, 2019

(51) Int. Cl.
  *B22F 9/24* (2006.01)
  *B22F 1/00* (2006.01)
  *B82Y 40/00* (2011.01)
  *B82Y 30/00* (2011.01)

(52) U.S. Cl.
  CPC .............. *B22F 9/24* (2013.01); *B22F 1/0018* (2013.01); *B22F 2301/255* (2013.01); *B22F 2304/054* (2013.01); *B22F 2998/10* (2013.01); *B82Y 30/00* (2013.01); *B82Y 40/00* (2013.01)

(58) Field of Classification Search
  None
  See application file for complete search history.

(56) References Cited

U.S. PATENT DOCUMENTS

| | | |
|---|---|---|
| 2010/0200501 A1 | 8/2010 | Hoag et al. |
| 2011/0110723 A1* | 5/2011 | Varma .................. B22F 1/0018 405/128.75 |
| 2017/0100338 A1 | 4/2017 | Awad et al. |

FOREIGN PATENT DOCUMENTS

| | | |
|---|---|---|
| CN | 106513707 A | 3/2014 |
| CN | 104923805 A | 9/2015 |

OTHER PUBLICATIONS

Parashar et al., "Bioinspired Synthesis of Silver Nanoparticles", Digest Journal of Nanomaterials and Biostructures, vol. 4, No. 1, pp. 159-166, Mar. 2009.*
Rasheed, T. et al., "Green biosynthesis of silver nanoparticles using leaves extract of Artemisia vulgaris and their potential biomedical application", Colloids and Surfaces B: Biointerfaces, vol. 158, pp. 408-415, available online Jul. 8, 2017.*
Jazani, A.M. et al, "Intestinal Helminths from the Viewpoint of Traditional Persian Medicine Versus Modern Medicine", African Journal of Traditional, Complementary and Alternative Medicine, vol. 15, No. 2, pp. 58-67, published online Feb. 23, 2018.*
Vasile, L. et al., "Green Biosynthesis Silver Nanoparticles Using Leaf Extract", Natural Resources and Sustainable Development, vol. 8, issue 1, revised May 31, 2018.*
MubarakAli et al., "Plant extract mediated synthesis of silver and gold nanoparticles and its antibacterial activity against clinically isolated pathogens," Colloids and Surfaces B: Biointerfaces, vol. 85, No. 2, pp. 360-365, 2011.
SivaKumar et al., "Silver Nanoparticles Synthesis of Mentha arvensis Extracts and Evaluation of Antioxidant Properties," Bioscience and Bioengineering, vol. 1, No. 2, 2015, pp. 22-28.

(Continued)

*Primary Examiner* — George Wyszomierski
(74) *Attorney, Agent, or Firm* — Richard C. Litman; Nath, Goldberg & Meyer (57) ABSTRACT

A method of synthesizing silver nanoparticles using mint can include providing a solution including silver nitrate, providing an extract of mint, mixing the silver nitrate solution and the extract solution to form an aqueous mixture, and resting the aqueous mixture for a period of time to form the silver nanoparticles. The mint can be mint grown and harvested in Medina, Saudi Arabia.

3 Claims, 10 Drawing Sheets

(56) References Cited

OTHER PUBLICATIONS

Bhoir et al., "Silver Nanoparticles Synthesized Using Mint Extract and their Application in Chitosan/Gelatin Composite Packaging Film," International Journal of Nanoscience, vol. 16, No. 1, Jul. 14, 2016.
Sarkar el al., "Green Synthesis of Silver Nanoparticles using *Mentha asiatica* (Mint) Extract and Evaluation of their Antimicrobial Potential," International Journal of Current Research in Biosciences and Plant Biology, vol. 4, No. 1, Jan. 2017.
Loo et al., "Synthesis of silver nanoparticles by using tea leaf extract from Camellia Sinensis," International Journal of Nanomedicine, vol. 7, pp. 4263-4267, 2012.

\* cited by examiner

METHOD OF SYNTHESIZING SILVER NANOPARTICLES USING MINT EXTRACT

BACKGROUND

1. Field

The disclosure of the present patent application relates to nanotechnology, and particularly to a method of synthesizing silver nanoparticles using mint extract.

2. Description of the Related Art

Recently, metal nanoparticles have demonstrated important uses in a variety of fields. In particular, silver nitrate derived nanoparticles have been of interest to researchers, due to their wide range of applications including electronics, biosensing, plasmonics, optics, and medicine.

Synthesis of silver nanoparticles (AgNPs) has been achieved by a variety of methods, including physicochemical, thermal decomposition, electrochemical, microwave assisted, sonochemical, solvothermal, photosynthesis, photochemical reduction, chemical reduction and continuous-flow methods. These methods are often costly or produce byproducts that pose increased risks to human health and the environment.

In recent years, green or environmentally friendly chemical methods have been developed to prepare silver nanoparticles using plant extracts. Green chemistry has the advantage of being fast, environmentally friendly, and economical.

Thus, a method of synthesizing silver nanoparticles solving the aforementioned problems are desired.

SUMMARY

A method of synthesizing silver nanoparticles using mint can include providing a solution including silver nitrate, providing an extract of mint, mixing the silver nitrate solution and the extract solution to form an aqueous mixture, and resting the aqueous mixture for a period of time to form the silver nanoparticles. The mint can be mint grown and harvested in Medina, Saudi Arabia. In an embodiment, the mint may be the Nammam or the Doosh varieties of mint grown in Medina.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method of synthesizing silver nanoparticles using mint can include providing a solution including silver nitrate, providing an extract of mint, mixing the silver nitrate solution and the extract solution to form an aqueous mixture, and resting the aqueous mixture for a period of time to form the silver nanoparticles. The silver nanoparticles (hereinafter, "AgNPs") can be spherical and/or triangular in shape. The silver nanoparticles can have a size that is less than 100 nm. The silver nanoparticles may have a size between about 5 nm and about 16 nm. The mint can be mint obtained from Medina, Saudi Arabia (herein, "Medina mint"). Medina is a province in the western region of Saudi Arabia. Medina mint can include a number of varieties, including Moroccan mint, mint of Al-Ahsa, Nammam mint, Nawami mint, and Doosh. In an embodiment, the mint is Nammam mint. In an embodiment, the mint is Doosh mint.

As used herein, the term "about" when modifying a numerical value means within 10% of the modified value.

Mint or *Mentha* is a genus of plants in the family Lamiaceae. Mint grows all over the world, including in Europe, the Americas, the cold regions of the shores of the Mediterranean, the Arabian Peninsula, Java, India, and China. Mint contains many useful active ingredients, including thymol and carvacrol, adoriganine, episitic substances, rosemarinic acid, resinous materials and flavonoids.

Figure 11A:
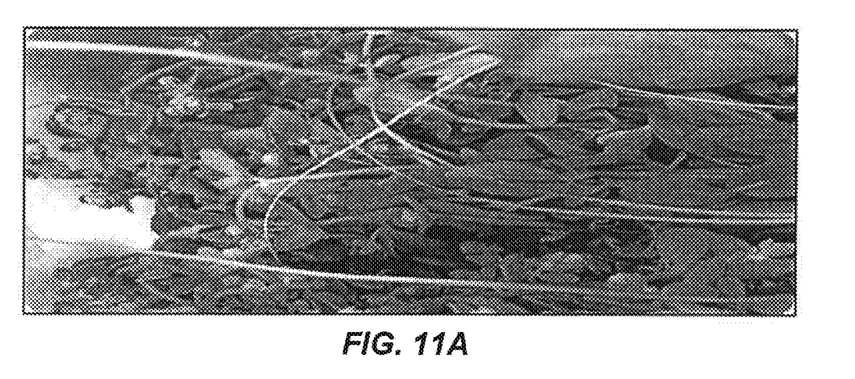
FIG. 11A depicts Medina mint (Doosh).
Figure 11B:
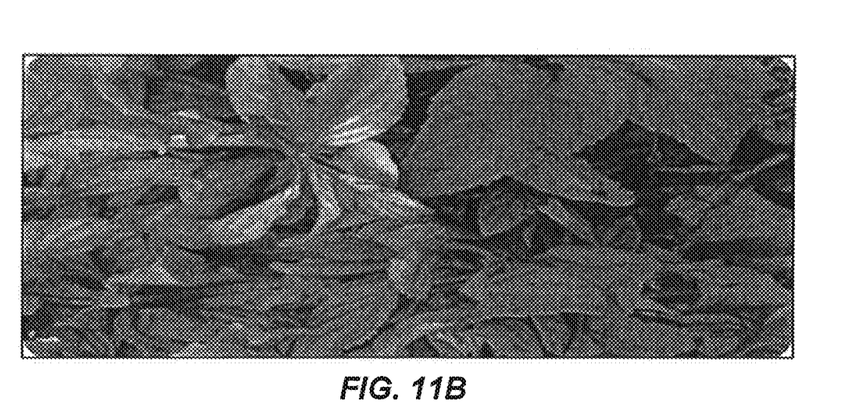
FIG. 11B depicts Medina mint (Nammam).
Figure 11C:
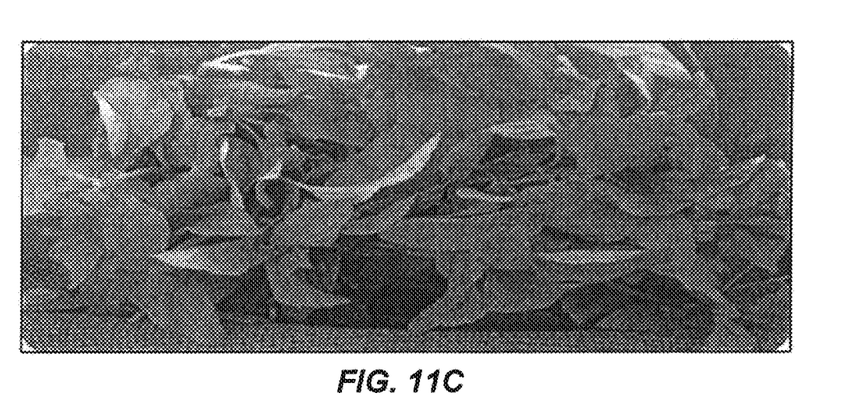
FIG. 11C depicts Medina mint (Nammam).

Medina mint grown in the Medina region (Al-Madinah Al Munawwarah) of Saudi Arabia contains active agents that may be useful to increase the immune response, calm muscles, prevent or reduce contractions, relieve stomach irritation, relieve headaches, and treat colds and respiratory diseases. Moroccan mint may have small leaves, a fragrant smell, and a red leg. In the alternative, Moroccan mint may have large leaves with a green stalk. Moroccan mint is commonly used in cooking. Mint of Al Ahsa may have convex, green leaves and a scented smell. Doosh may have long brown buns and small flat leaves (FIG. 11A). It may be used to treat a variety of digestive problems. Nammam mint grows as a perennial herbaceous plant to a height of around 50 cm. Nammam mint may have coarse leaves, pink flowers, and a savory taste (FIGS. 11B-11C). Nammam mint may be used as a source of flavonoids, thymol, and saopuride. Nammam mint may also be used to treat colds or nasal congestion, to treat infections and reduce fevers, and in weight loss.

The extract may be prepared by collecting leaves of a Medina mint plant for use as the extraction substrate. These leaves may then be weighed, and a desired amount may be placed in a container with water, heated for a period of time to provide a mint extract. The resulting mint extract may be decanted.

Green synthesis of silver nanoparticles may be achieved by mixing Medina mint extract with silver nitrate and incubating the mixture at room temperature until the color of the mixture darkens, indicating the production of AgNPs.

In an embodiment, the silver nanoparticles formed by the green synthesis may be used alone or together with the Medina mint extract in which they are formed to produce cosmetics, foods, and medicines. In an embodiment, the silver nanoparticles or a composition including the silver nanoparticles and the Medina mint extract may provide antibacterial activity.

In an embodiment, the silver nanoparticles may be synthesized using Nammam mint, and the resulting silver nanoparticles may be between about 10 nm and about 16 nm in size.

In an embodiment, the silver nanoparticles may be synthesized using Doosh mint, and the resulting silver nanoparticles may be between about 5 nm and about 16 nm in size.

Example 1

Green Synthesis of Medina Mint (Nammam and Doosh) AgNPs 10 g of Medina mint (Nammam and Doosh) leaves were placed in a 500 mL beaker with 100 mL distilled water and heated to 60° C. for 10 minutes before decanting the resulting Medina mint extract. 12 mL of the Medina mint extract was then mixed with 100 mL $AgNO_3$ (1 mM) at room temperature until a color change to light brown was observed (after 5 minutes), resulting in formation of the silver nanoparticles.

Example 2

Characterization of the AgNPs

Figure 1:
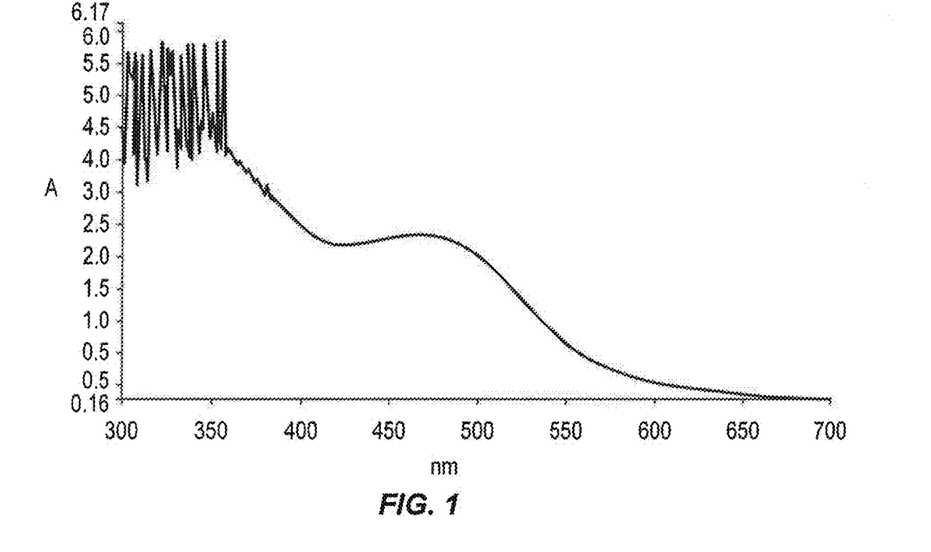
FIG. 1 depicts a UV-visible spectrum of a Medina mint (Doosh) AgNP extract.
Figure 2:
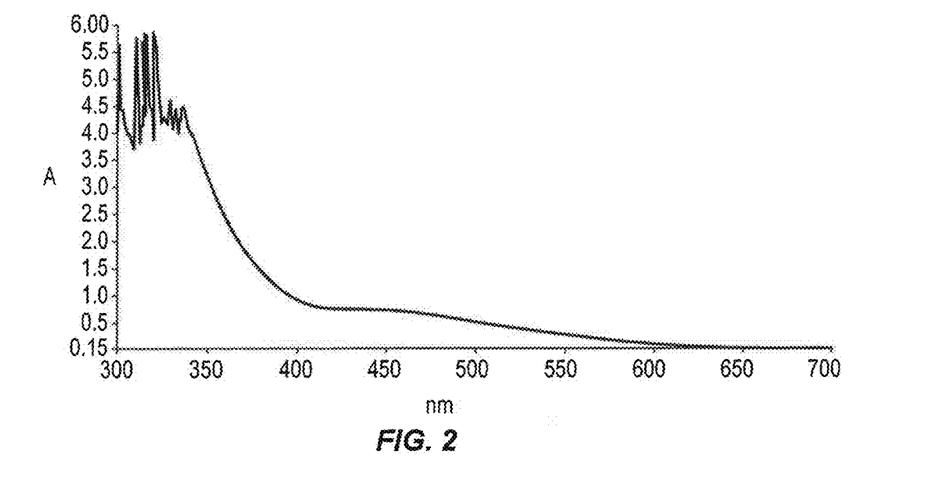
FIG. 2 depicts a UV-visible spectrum of a Medina mint (Nammam) AgNP extract.
Figure 3:
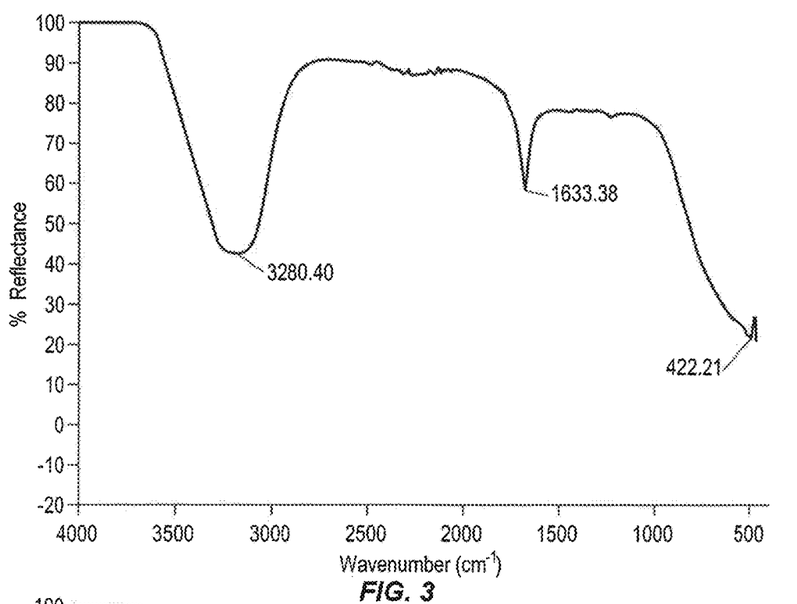
FIG. 3 depicts a FTIR spectrum of a Medina mint (Doosh) AgNP extract.
Figure 4:
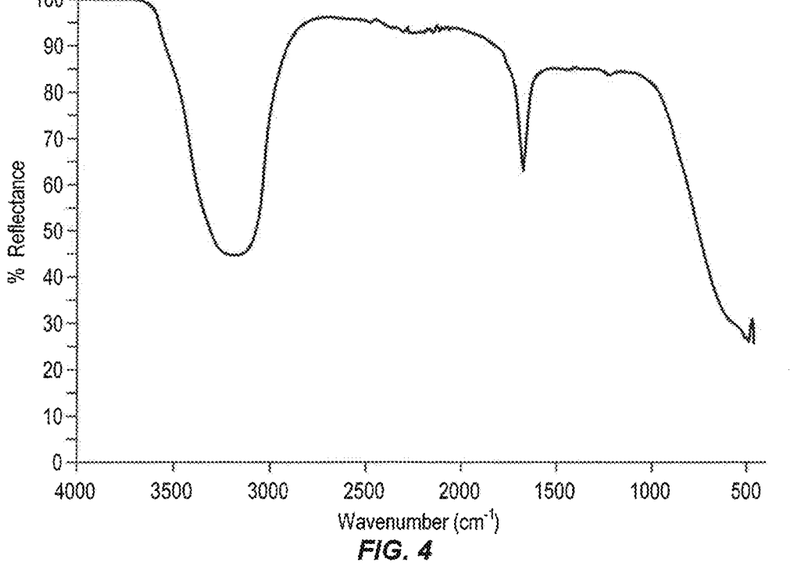
FIG. 4 depicts a FTIR spectrum of a Medina mint (Nammam) AgNP extract.

Ultraviolet-visible (UV-VIS) spectroscopy and Fourier-transform infrared (FTIR) spectroscopy were used to characterize the AgNPs prepared as set forth in Example 1. UV-VIS spectroscopy at a range of 300-700 nm produced an absorption band at around 400-420 nm, suggesting the formation of nanoparticles (See FIGS. 1-2). FTIR spectra (using FTIR with 4000-400 $cm^{-1}$ of spectral range in KBr pellet) of the extracts taken after synthesis of the silver nanoparticles demonstrated a strong band at 1635 $cm^{-1}$, attributed to carbonyl groups, a less intense broad peak at 2122 $cm^{-1}$, attributed to C=O stretching, and a strong, intense band at 3280 $cm^{-1}$ attributed to alcohol hydroxyl groups. (See FIG. 4). Similar peaks were observed for silver nanoparticles formed using Medina mint of the Doosh variety, as illustrated in FIG. 3.

Figure 5A:
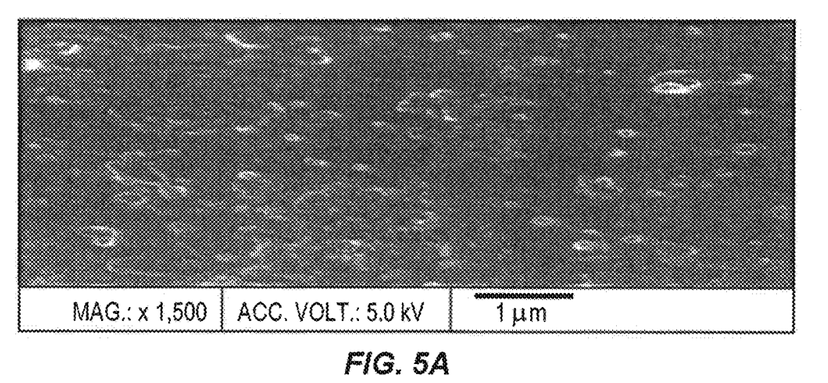
FIG. 5A depicts a scanning electron micrograph of a Medina mint (Doosh) AgNP extract.
Figure 5B:
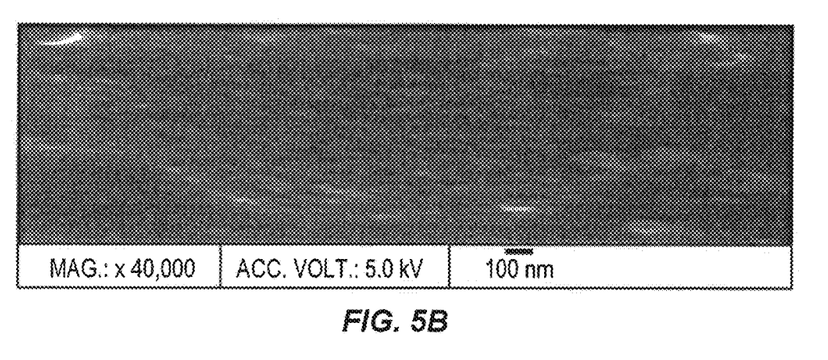
FIG. 5B depicts a scanning electron micrograph of a Medina mint (Doosh) AgNP extract.
Figure 5C:
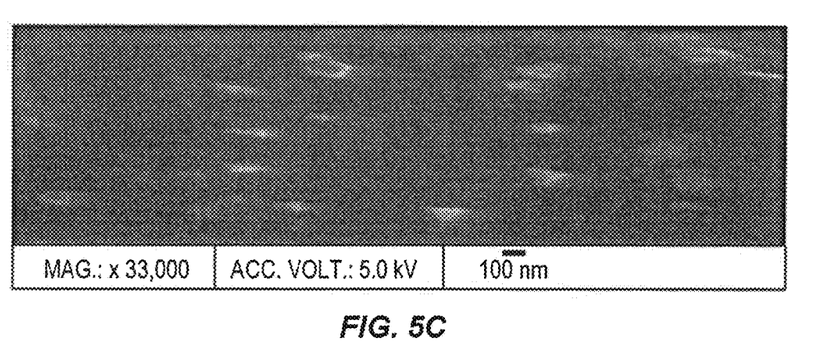
FIG. 5C depicts a scanning electron micrograph of a Medina mint (Doosh) AgNP extract.
Figure 6A:
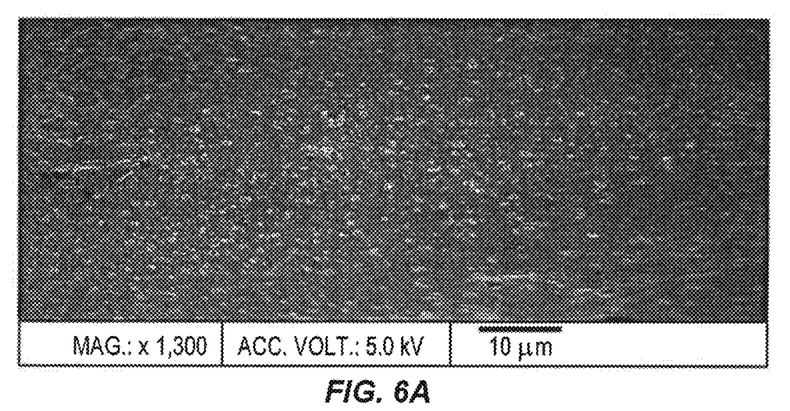
FIG. 6A depicts a scanning electron micrograph of a Medina mint (Nammam) AgNP extract.
Figure 6B:
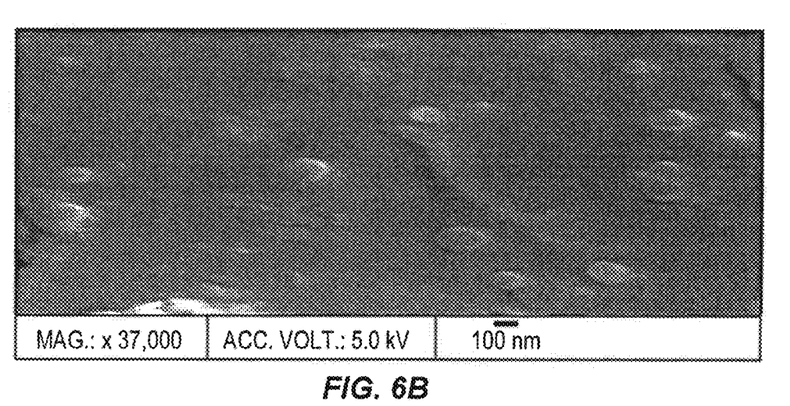
FIG. 6B depicts a scanning electron micrograph of a Medina mint (Nammam) AgNP extract.
Figure 6C:
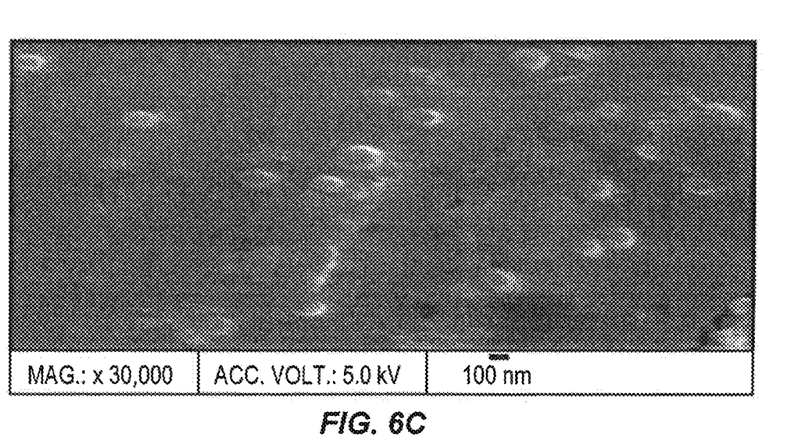
FIG. 6C depicts a scanning electron micrograph of a Medina mint (Nammam) AgNP extract.
Figure 6D:
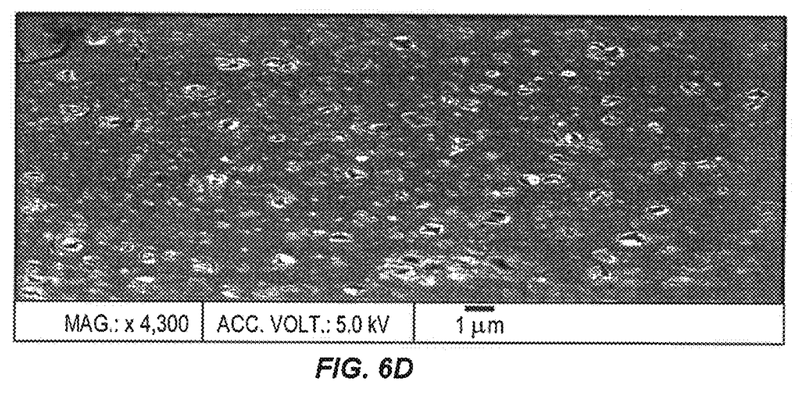
FIG. 6D depicts a scanning electron micrograph of a Medina mint (Nammam) AgNP extract.
Figure 6E:
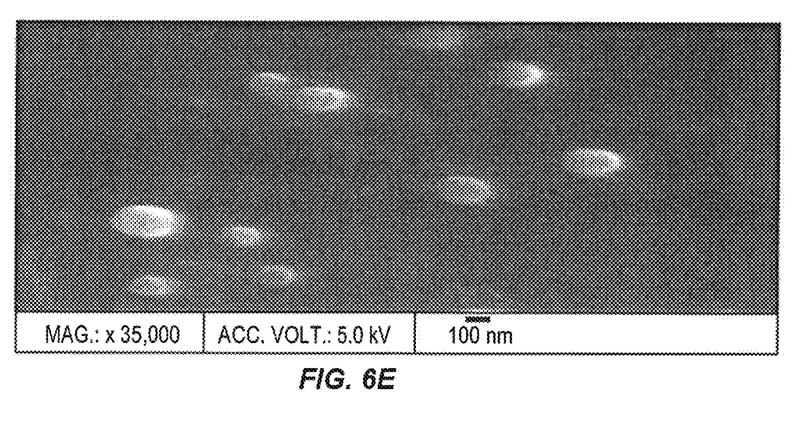
FIG. 6E depicts a scanning electron micrograph of a Medina mint (Nammam) AgNP extract.

Scanning electron micrographs (SEMs) of AgNPs formed using Doosh extract demonstrated formation of both spherical (FIGS. 5A-5B) and triangular nanoparticles (FIG. 5C). SEMs of AgNPs formed using Nammam extract demonstrated formation of spherical nanoparticles (FIGS. 6A-6E).

Figure 7A:
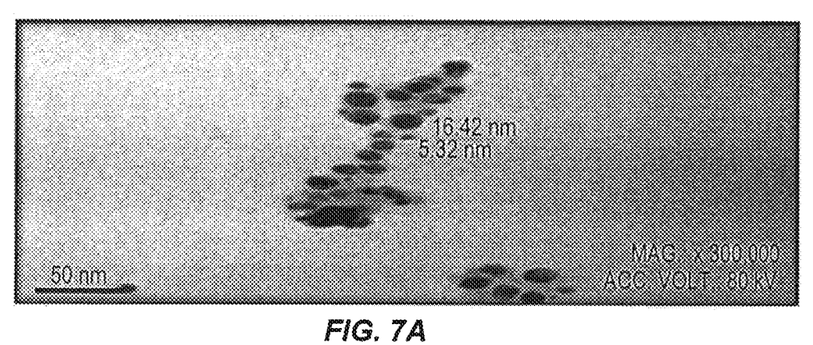
FIG. 7A depicts a transmission electron micrograph of a Medina mint (Doosh) AgNP extract at 50 nm.
Figure 7B:
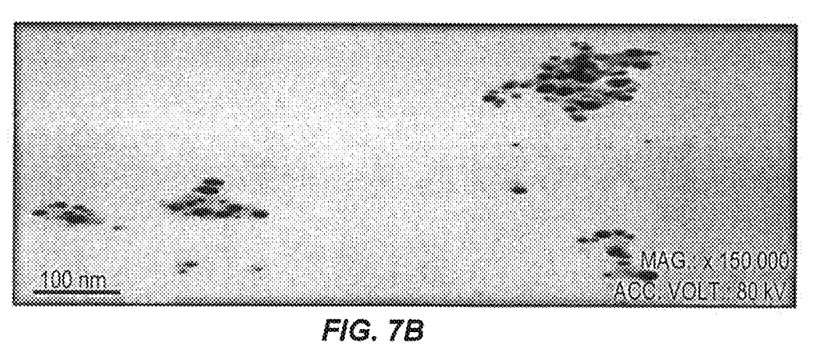
FIG. 7B depicts a transmission electron micrograph of a Medina mint (Doosh) AgNP extract at 100 nm.
Figure 7C:
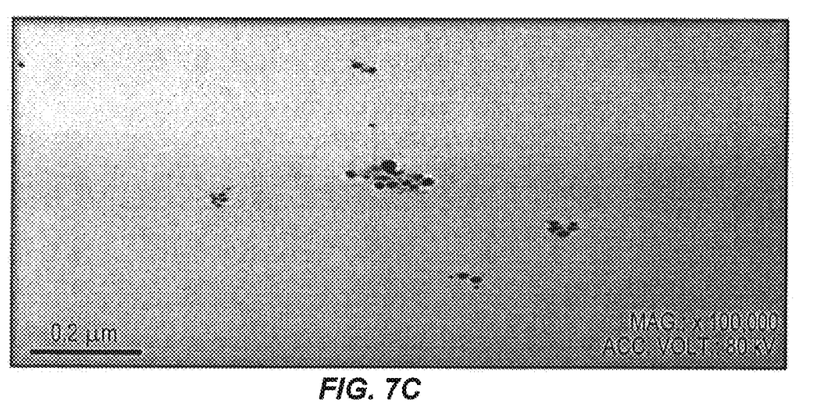
FIG. 7C depicts a transmission electron micrograph of a Medina mint (Doosh) AgNP extract at 0.2 µm.
Figure 8A:
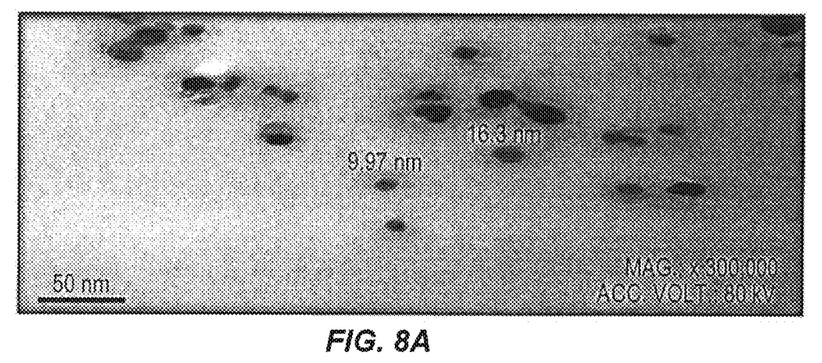
FIG. 8A depicts a transmission electron micrograph of a Medina mint (Nammam) AgNP extract at 50 nm.
Figure 8B:
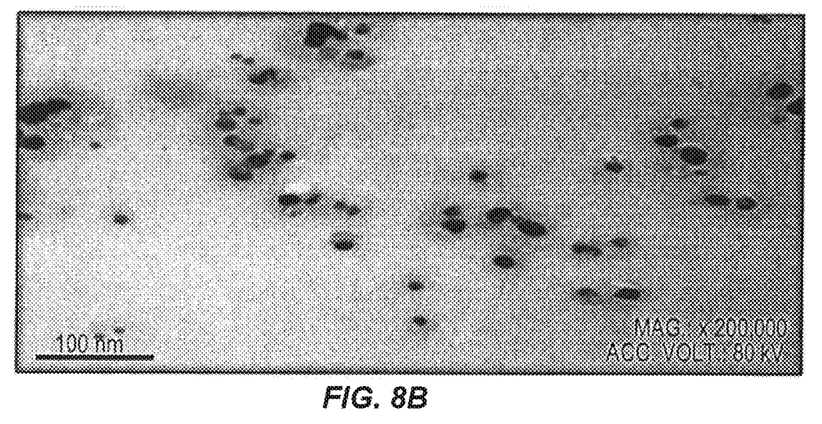
FIG. 8B depicts a transmission electron micrograph of a Medina mint (Nammam) AgNP extract at 100 nm.
Figure 8C:
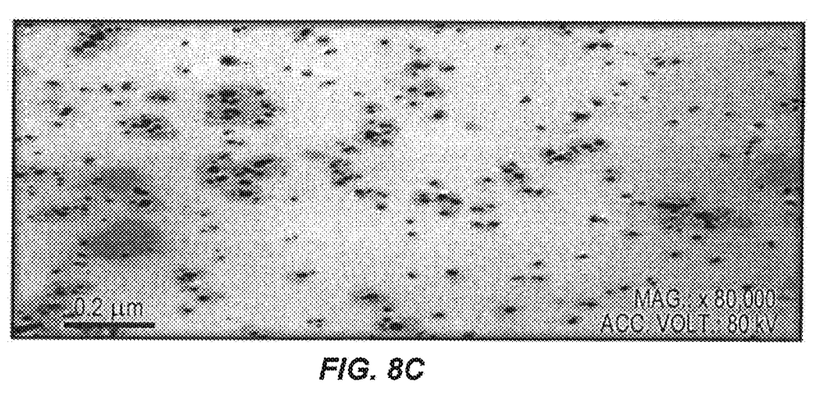
FIG. 8C depicts a transmission electron micrograph of a Medina mint (Nammam) AgNP extract at 0.2 µm.

Transmission electron micrographs (TEMs) confirmed formation of spherical nanoparticles or groups of spherical nanoparticles using Doosh extract (FIGS. 7A-7C) and using Nammam extract (FIGS. 8A-8C).

Figure 9A:
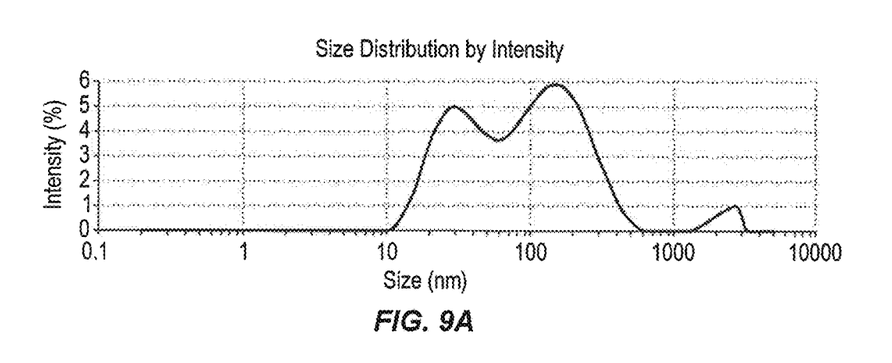
FIG. 9A depicts a zeta size spectrum of a Medina mint (Nammam) AgNP extract.
Figure 9B:
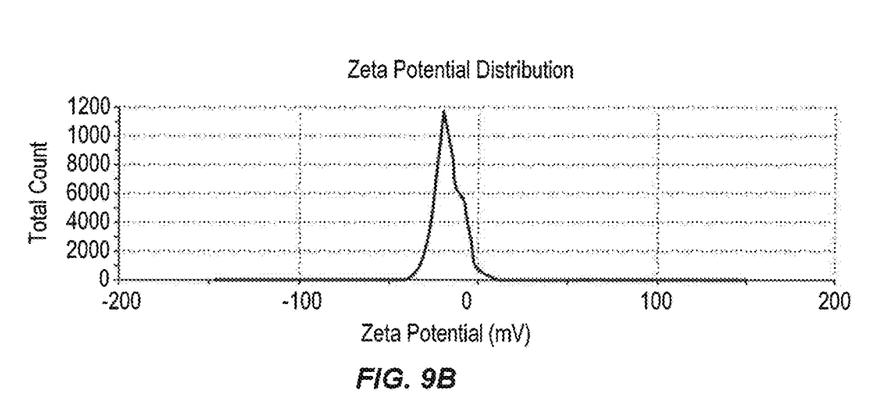
FIG. 9B depicts a zetapotential spectrum of a Medina mint (Nammam) AgNP extract.
Figure 10A:
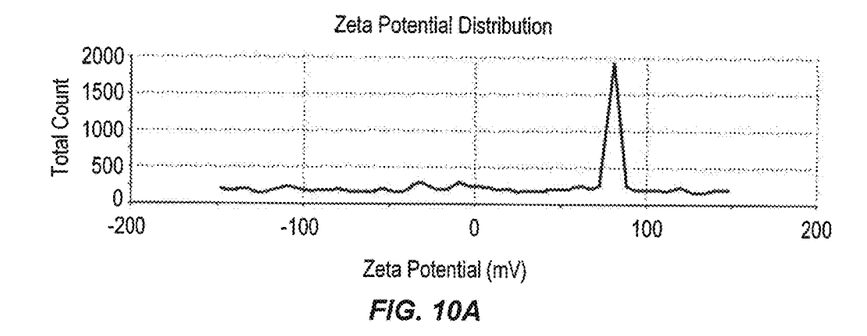
FIG. 10A depicts a zeta size spectrum of a Medina mint (Doosh) AgNP extract.
Figure 10B:
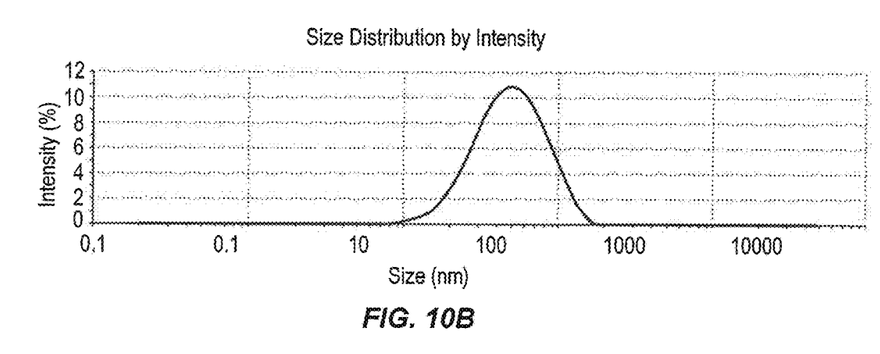
FIG. 10B depicts a zetapotential spectrum of a Medina mint (Doosh) AgNP extract.

Zeta potential was analyzed to measure nanoparticle stability and surface charge. Zeta sizer spectra of silver nanoparticles prepared using a Doosh extract and a Nammam extract are shown in FIGS. 10A and 9A, respectively. Zeta potential spectra of silver nanoparticles prepared using a Doosh extract and a Nammam extract are shown in FIGS. 10B and 9B, respectively. The extracts displayed lower zeta potential values when lower extract quantities were used and higher zeta potential values when increased extract quantities were used; demonstrating that increased concentration of the prepared AgNPs resulted in increased stability due to repulsion between the nanoparticles.

The particle size distribution and zeta potential distribution curves reveal that the AgNPs are polydispersed. The AgNPs have an average diameter of about 42.37 nm and a corresponding average zeta potential value of −0.687 mV. The high negative potential value supports long term stability, good colloidal nature, and high dispersity of the AgNPs due to negative-negative repulsion. The AgNPs synthesized using the Nammam extract had an average diameter of 61.11 nm and an average zeta potential value of −16.6 mV. The high negative zeta potential value of the AgNPs synthesized using the Nammam extract can allow these AgNPs to be more stable than the AgNPs synthesized using the Doosh extract.

It is to be understood that the green synthesis of silver nanoparticle extracts using Medina mint is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of synthesizing silver nanoparticles from mint, comprising:
   providing a first solution comprising silver nitrate;
   providing a second solution comprising an aqueous extract of mint, wherein the mint comprises the Nammam variety of the mint; and
   mixing the first solution and the second solution to form silver nanoparticles in an aqueous mixture, wherein the silver nanoparticles comprise nanoparticles having an average diameter of 61 nm and an average zeta potential value of −16.6 mV.

2. The method of synthesizing silver nanoparticles according to claim 1, further comprising:
   extracting the mint in water at 60° C. for 10 minutes to provide a mint extract; and
   decanting the mint extract to form the second solution.

3. The method of synthesizing silver nanoparticles according to claim 1, wherein: providing the second solution includes extracting 10 g of the mint in 100 mL of water; and mixing the first solution and the second solution includes mixing 100 mL of the first solution with 12 mL of the second solution.

* * * * *